United States Patent
Lee et al.

(10) Patent No.: US 8,927,123 B2
(45) Date of Patent: Jan. 6, 2015

(54) CAP ASSEMBLY OF CYLINDRICAL RECHARGEABLE BATTERY AND CYLINDRICAL RECHARGEABLE BATTERY

(75) Inventors: Je Jun Lee, Daejeon (KR); Sung Jong Kim, Daejeon (KR); Cha Hun Ku, Daejeon (KR); Hong-Jeong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 146 days.

(21) Appl. No.: 12/922,016

(22) PCT Filed: Jun. 11, 2010

(86) PCT No.: PCT/KR2010/003780
§ 371 (c)(1),
(2), (4) Date: Oct. 13, 2010

(87) PCT Pub. No.: WO2010/147340
PCT Pub. Date: Dec. 23, 2010

(65) Prior Publication Data
US 2011/0104523 A1    May 5, 2011

(30) Foreign Application Priority Data
Jun. 15, 2009   (KR) .................. 10-2009-0052866

(51) Int. Cl.
*H01M 2/04*   (2006.01)
(Continued)

(52) U.S. Cl.
CPC ............. *H01M 2/046* (2013.01); *H01M 2/022* (2013.01); *H01M 2/1241* (2013.01);
(Continued)

(58) Field of Classification Search
CPC ................................................ H01M 2/1229

USPC .................... 429/180, 7, 171–174
See application file for complete search history.

(56) References Cited

U.S. PATENT DOCUMENTS 6,322,921 B1    11/2001  Iwaizoni et al.
7,378,187 B2 *  5/2008   Kim ........................... 429/185
(Continued)

FOREIGN PATENT DOCUMENTS

KR    10-0357843 B1    10/2002
KR    10-0624935 B1    9/2006
(Continued)

OTHER PUBLICATIONS

Lund Instrument Engineering. Standard cylindrical and prismatic battery size chart. (Captured May 22, 2009 via web.archive.org). Retrieved Sep. 2, 2011. http://web.archive.org/web/20090522003430/http://www.powerstream.com/Size.htm.*

*Primary Examiner* — Maria J Laios
*Assistant Examiner* — Robert S Carrico
(74) *Attorney, Agent, or Firm* — Birch, Stewart, Kolasch & Birch, LLP

(57) ABSTRACT

A cap assembly of a cylindrical rechargeable battery includes an integrated gasket obtained by integrating a first gasket covering a top cap, a PTC element, and a safety vent and a second gasket covering a CID. The rechargeable battery including the cap assembly has the advantages of increasing a contact area between a safety vent and a gasket by integrating the existing dual-gasket structure to thereby increase a sealing effect, increasing a short circuit reactivity of the CID by freely changing the gasket structure according to the diameter of the current interrupting member to thereby improve stability, simplify components, and reduce a production unit cost.

10 Claims, 4 Drawing Sheets

(51) Int. Cl.
    *H01M 2/08* (2006.01)
    *H01M 10/0525* (2010.01)
    *H01M 10/02* (2006.01)
    *H01M 2/02* (2006.01)
    *H01M 2/12* (2006.01)
    *H01M 10/04* (2006.01)

(52) U.S. Cl.
    CPC ......... *H01M 10/0525* (2013.01); *H01M 2/027* (2013.01); *H01M 2/0275* (2013.01); *H01M 2/0413* (2013.01); *H01M 10/02* (2013.01); *H01M 10/0431* (2013.01); *H01M 2200/106* (2013.01); *H01M 2200/20* (2013.01)
    USPC ................ 429/7; 429/164; 429/174; 429/175

(56) References Cited

U.S. PATENT DOCUMENTS

| | | |
|---|---|---|
| 2005/0118495 A1 | 6/2005 | Kim |
| 2006/0078787 A1* | 4/2006 | Sato et al. ........................ 429/62 |
| 2008/0171260 A1* | 7/2008 | Kim et al. ........................ 429/82 |
| 2009/0148767 A1* | 6/2009 | Yamashita et al. ............ 429/181 |
| 2010/0015508 A1 | 1/2010 | Hwang |

FOREIGN PATENT DOCUMENTS

| | | |
|---|---|---|
| KR | 10-2009-0027316 A | 3/2009 |
| TW | 200830601 A | 7/2008 |
| WO | 98/01913 A1 | 1/1998 |

* cited by examiner

--PRIOR ART--

--PRIOR ART--

--PRIOR ART--

CAP ASSEMBLY OF CYLINDRICAL RECHARGEABLE BATTERY AND CYLINDRICAL RECHARGEABLE BATTERY

The present application claims priority to Korean Application No. 10-2009-0052866 filed in Korea on Jun. 15, 2009, the entire contents of which is hereby incorporated by reference in its entirety.

BACKGROUND OF THE INVENTION

1. Field of the Invention

The present invention relates to a stable cap assembly and a cylindrical rechargeable battery capable of increasing a contact area between a safety vent and a gasket by integrating a dual-gasket structure to thereby increase a sealing effect, increasing a short circuit reactivity of a current interrupting member by freely changing the gasket structure according to the diameter of the current interrupting member to thereby improve stability, simplify components, and reduce a production unit cost, and a cylindrical rechargeable battery including the same.

2. Description of the Related Art

As demand for developing a technique for mobile devices is increasing, demand for rechargeable batteries as an energy source is rapidly on the rise, and among them, a lithium rechargeable battery having a high energy density and discharge voltage has been actively studied and commercialized so as to be used.

A rechargeable battery is classified into a cylindrical battery and an angular battery including an electrode assembly installed in a cylindrical or angular metal can, respectively, and a pouch type battery including an electrode assembly installed in a pouch type case of an aluminum laminate sheet. Among them, the cylindrical battery has the advantage in that it has a relatively great capacity and is structurally stable.

Also, the electrode assembly installed in a battery case is a generating element which has a stacked structure including a positive electrode/separation film/negative electrode and can be charged or discharged. The electrode assembly is classified into a jelly-roll type electrode assembly formed by winding the positive and negative electrodes, long sheet type electrodes coated with an active material, and the separation film interposed therebetween, and a stack type electrode assembly formed by sequentially stacking a plurality of positive electrodes and negative electrodes with a separation film interposed therebetween. The jelly-roll type electrode assembly has the advantages in that it can be easily fabricated and has a high energy density per weight.

FIG. 1 is a schematic vertical sectional perspective view of a general cylindrical rechargeable battery.

As shown in FIG. 1, the cylindrical rechargeable battery 100 is fabricated such that a jelly-roll type (winding type) electrode assembly 120 is received in a cylindrical case 130, electrolyte is injected into the cylindrical case 130, and a top cap 140 including an electrode terminal (e.g., a positive electrode terminal (not shown)) is then coupled to an open upper end of the case 130.

The electrode assembly 120 has a structure in which a positive electrode 121, a negative electrode 122 and a separation film 123 are sequentially stacked and then wound in a circular form, and a cylindrical central pin 150 is insertedly positioned in a core (i.e., a central part of the jelly-roll). The central pin 150 is generally made of a metal material in order to provide a certain strength and has a hollow cylindrical structure formed by bending a plate material in a circular form. The central pin 150 serves to fix and support the electrode assembly and serves as a passage for discharging a gas generated due to an internal reaction during charging or discharging or operation therethrough. Meanwhile, the lithium rechargeable battery has shortcomings that it is instable. For example, when the battery is over-charged by more than about 4.5 V, an active material of the positive electrode is decomposed, a lithium metal is grown as dendrite from the negative electrode, and the electrolyte is decomposed. In this process, heat is generated to accelerate a plurality of subreactions such as the decomposition reaction, to cause an ignition and explosion of the battery.

Thus, in order to solve such a problem, as shown in FIG. 2, the general cylindrical rechargeable battery includes a current interruptive device (CID) 50 mounted in a space between an electrode assembly (not shown) and a top cap 10 in order to interrupt current and resolve a withstanding voltage when the battery operates abnormally.

The top cap 10 forms a protruded positive electrode terminal including an exhaust hole. A positive temperature coefficient (PTC) element 20 is formed under the top cap 10. When internal temperature of the battery goes up, battery resistance of the PTC element 20 greatly increases to interrupt current. A safety belt 30 is formed to be protruded downward in a normal state. When the pressure within the battery increases, the safety vent 30 is protruded to be ruptured to exhaust the gas. The CID 50 is configured such that one upper end portion is coupled to the safety vent 30 and one lower end portion is connected to a positive electrode of the electrode assembly. Portions of edges of the top cap 10, the PTC element 20, and the safety vent 30 are covered by a first gasket 60a, and the CID 50 is covered by a second gasket 60b.

Under a normal operational condition, the positive electrode of the electrode assembly is electrically connected with the top cap 10 by way of a lead, the CID 50, the safety vent 30, and the PTC element 20.

Meanwhile, when a gas is generated from the electrode assembly due to a cause such as an over-charge, or the like, to increase an internal pressure, the safety vent 30 is protruded upward as its shape is reversed, so as to be separated from the CID 50, interrupting the current. As a result, over-charging is prevented and thus stability is secured. Nonetheless, if the internal pressure keeps increasing, the safety vent 30 is ruptured and pressurizing gas is exhausted through the exhaust hole of the top cap 10 by way of the ruptured portion, thus preventing explosion of the battery. The stability and safety of the battery can be secured while the processes are sequentially performed.

The first gasket 60a, which fixedly packs the top cap 10, the PTC element 20, and the safety vent 30, is generally made of a resin material such as polypropylene that can be easily deformed. The second gasket 60b, which supports the CID 50, is made of the same material as that of the first gasket 60a.

However, as noted in FIG. 2, because the safety vent 30 is positioned at the lowermost end supported by the first gasket 60a and the CID 50 positioned at a lower side of the safety vent 30 is supported by the second gasket 60b, it happens that a portion of the safety vent 30 is not supported by the first gasket 60a, so sealing is likely to be not good.

When the sealing between the gasket and the safety vent is not good, moisture can be possibly infiltrate or electrolyte can be possibly leaked. The occurrence of such an electrolyte leakage may cause the electrolyte, an inflammable material, to be leaked out to be in contact with oxygen in the air to cause ignition, and moisture infiltrating into the battery may cause a decomposition reaction of the electrolyte to cause ignition or explosion.

Also, because the internal gas of the battery is partially leaked out, internal pressure required for operating the CID cannot be maintained. In detail, the operational process of the CID absolutely depends upon the amount of generated gas in the electrode assembly, so if the amount of generated gas is not sufficient or when the generated gas fails to increase to a certain level of amount within a short time, CID short-circuit is belated, so the continuous electrical connection of the electrode assembly would cause a thermal runaway phenomenon. The thermal runaway is generated or accelerated when the battery is placed in the continuous electrical connection state, increasing the likelihood that the battery is ignited or exploded, so there is a severe problem of stability. In addition, the recent incidents of ignitions of notebook computers stress the significance of stability and safety of batteries.

Therefore, development of a battery having a noble structure, which can solve the problems of the related art battery structure in which the imperfect sealing between the cap assembly and the gasket covering the cap assembly causes the electrolyte leakage and the inappropriate discharge of gas, is highly required.

SUMMARY OF THE INVENTION

Therefore, an object of the present invention is to solve the problem of the related art battery having the structure in which the first gasket covering the top cap, the PTC element, and the safety vent and the second gasket covering the CID are separately configured to cause a leakage of electrolyte and an inappropriate discharge of an internal gas.

In the present invention, a first gasket covering a top cap, a positive temperature coefficient (PTC) element, and a safety vent and a second gasket covering a current interruptive device (CID), namely, a dual-gasket structure, are integrated to a single gasket structure to increase the area where the safety vent and the gasket are in contact to obtain a good sealing effect. In the single gasket structure, the diameter of the CID can be adjusted to increase a short-circuit reactivity of the CID, thereby improving the stability and safety of a battery and simplify the structure of components.

Thus, another object of the present invention is to provide a cylindrical rechargeable battery employing a cap assembly having such an altered structure to thus obtain stability.

To achieve the above objects, there is provided a cap assembly of a cylindrical rechargeable battery having an integrated gasket obtained by integrating a first gasket covering a top cap, a PTC element, and a safety vent and a second gasket covering a CID.

Because the first and second gaskets are integrated into the single gasket, a contact area between the gasket, the safety vent, and the CID may be increased.

The thickness of a lower end portion of the integrated gasket in contact with the safety vent and the CID may be as thin as 30 percent to 40 percent of the thickness of the original gasket.

The integrated gasket may further include a reinforcing member formed at a lower end portion thereof.

The reinforcing member may be added to the lower end portion of the integrated gasket by the thickness of the CID.

Because of the presence of the integrated gasket, the diameter of the CID may be adjusted.

The diameter of the CID may be 10 mm to 15 mm.

The lower end portion of the integrated gasket may be elastic to facilitate an insertion of the CID.

A notch may be formed on a concentric circle based on a protrusion of the CID.

To achieve the above objects, there is also provided a cylindrical rechargeable battery including the foregoing cap assembly.

The rechargeable battery is a lithium rechargeable battery.

The rechargeable battery including the cap assembly according to an exemplary embodiment of the present invention has the advantages of increasing a contact area between a safety vent and a gasket by integrating the existing dual-gasket structure to thereby increase a sealing effect, increasing a short circuit reactivity of the CID by freely changing the gasket structure according to the diameter of the current interrupting member to thereby improve stability, simplify components, and reduce a production unit cost.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

The present invention provides a cap assembly of a cylindrical rechargeable battery having an integrated gasket structure by integrating a first gasket covering a top cap, a PTC element, and a safety vent and a second gasket covering a current interruptive device (CID).

In detail, the present invention relates to a cap assembly mounted on an open upper end portion of a cylindrical can of a battery in which an electrode assembly is installed in the cylindrical can, and having an integrated gasket structure by integrating a first gasket covering a portion of an edge of the cap assembly and a second gasket covering a CID.

Exemplary embodiments of the present invention will now be described in detail with reference to the accompanying drawings.

A cap assembly according to an exemplary embodiment of the present invention is mounted on an open upper end portion of a cylindrical can of a battery having a structure in which an electrode assembly including a negative electrode, a separation film, and a positive electrode is installed in the cylindrical can. In detail, the cap assembly is configured such that the top cap 10, the PTC element 20, the safety vent 30, and the CID 50 are sequentially stacked and an integrated gasket 60 is mounted on an outer circumferential surface thereof.

Figure 1:
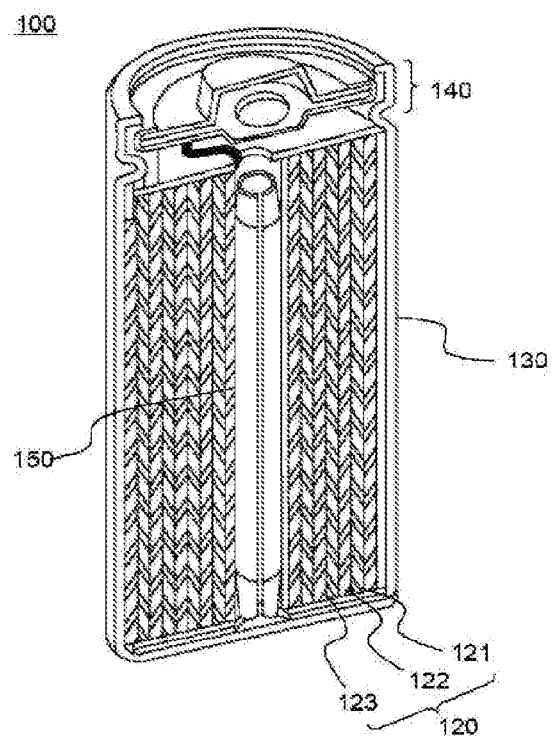
FIG. 1 is a vertical sectional perspective view of a general cylindrical rechargeable battery.
Figure 2:
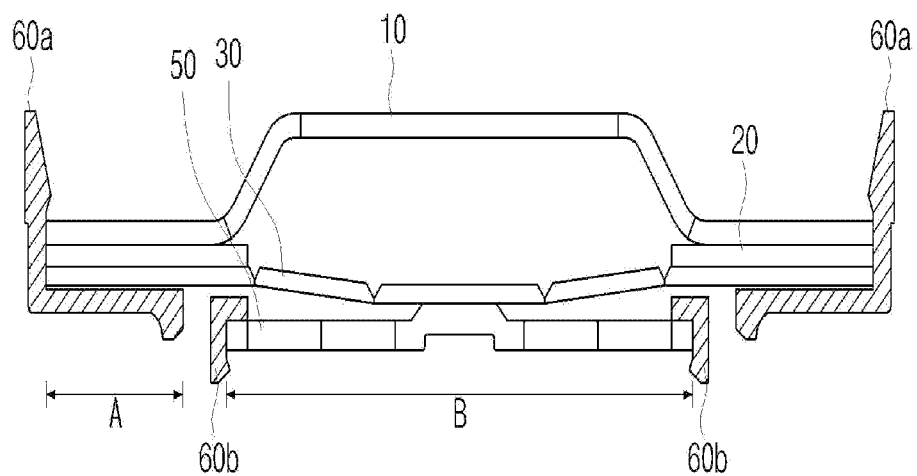
FIG. 2 is a view showing the structure of a cap assembly of the related art cylindrical rechargeable battery.
Figure 3:
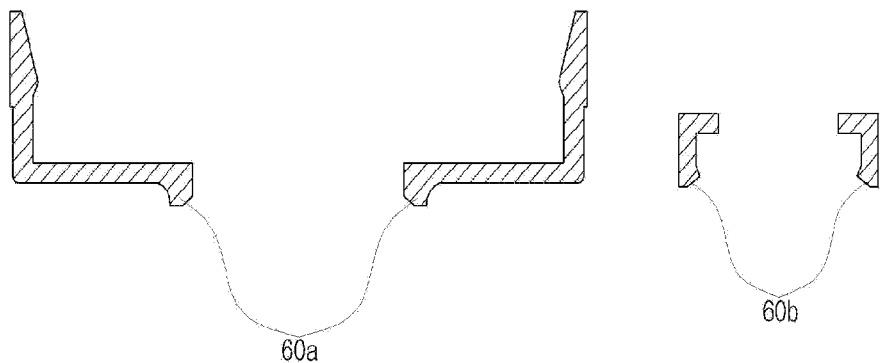
FIG. 3 is a view showing a dual-gasket structure including first and second gaskets of the related art cylindrical rechargeable battery.

The integrated gasket 60 is configured by integrating the dual-gasket structure including the first gasket covering the top cap, the PTC element, and the safety vent and the second gasket covering the CID 50 of the related art battery structure as illustrated in FIGS. 2 and 3. That is, as shown in FIGS. 4 and 5, the top cap, the PTC element, the safety vent, and the CID 50 can be covered with the single gasket.

Figure 4:
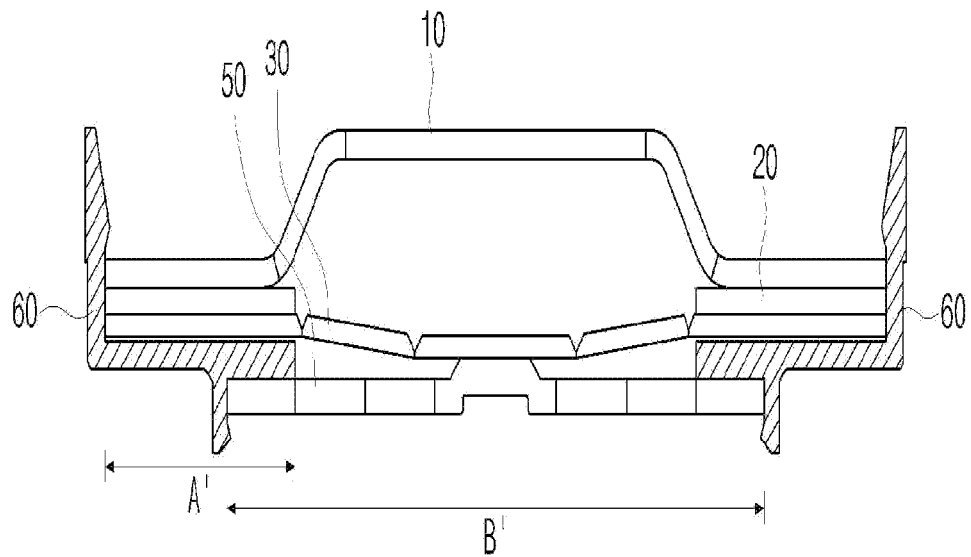
FIG. 4 is a view showing a cap assembly structure of a cylindrical rechargeable battery including an integrated gasket structure according to an exemplary embodiment of the present invention.
Figure 5:
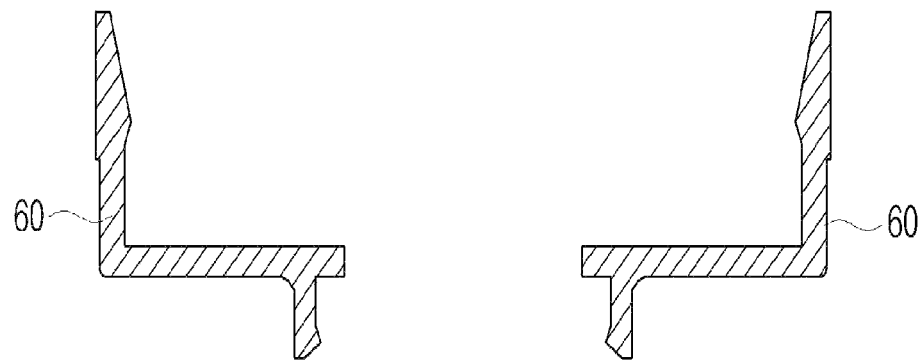
FIG. 5 shows the integrated gasket structure according to an exemplary embodiment of the present invention.

In the present exemplary embodiment, because the gasket is formed by integrating the first and second gaskets, a contact area (A') where the integrated gasket 60 and the safety vent 30 are in contact with each other as shown in FIG. 4 is larger than a contact area (A) where the first gasket 60a and the safety vent 30 are in contact with each other as shown in FIG. 2 according to the related art, achieving the effect of improving the sealing characteristics of the battery structure, and accordingly, insulation characteristics of the battery can be also improved. As a result, a problem such as a leakage of electrolyte due to the sealing can be solved.

Also, when current is interrupted according to the increase in a support area of the CID 50 and the integrated gasket 60, a short circuit reactivity of the CID 50 can be improved. In this case, the diameter (B') of the CID 50 in FIG. 4 can be larger than the diameter (B) of the CID 50 in FIG. 2. Namely, the gasket integration can bring about an alteration of the length (i.e., diameter) of the CID 50.

In detail, in case of the integrated gasket according to the present exemplary embodiment, the CID 50 can be configured to have a diameter ranging from 10 mm to 15 mm. Thus, because the diameter of the CID 50 can be adjusted within the foregoing range, a contact area between the gasket and the CID 50 can be increased to stabilize the CID short-circuit reactivity with the safety vent 30.

Besides, compared with the related art in which the first and second gaskets are separately fabricated and bonded to the cap assembly and the CID 50, the integrated gasket according to the present exemplary embodiment can simplify the components, thus simplifying an assembling process and reducing the production unit cost.

Figure 6:
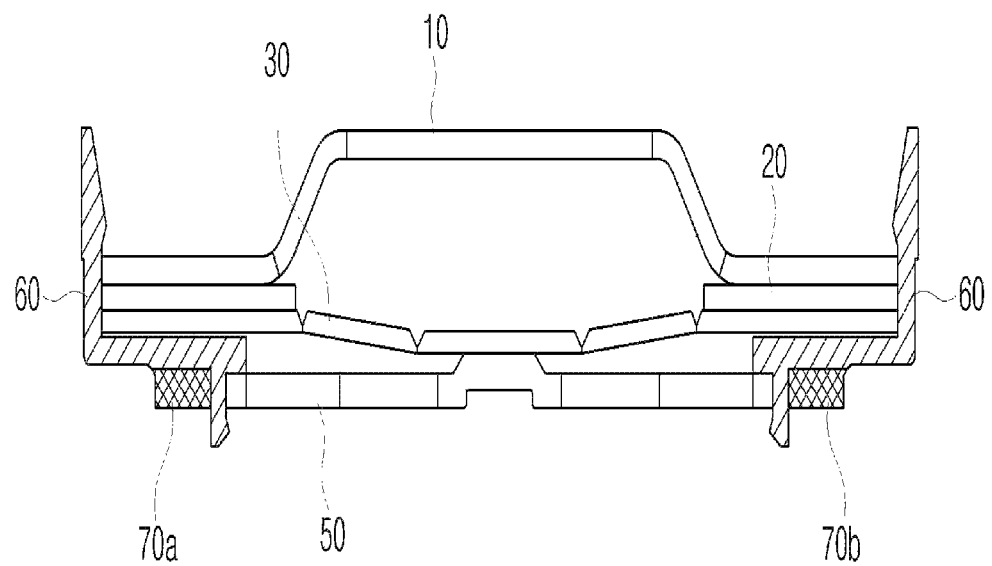
FIGS. 6 and 7 are views showing cap assembly structures including the gasket structure according to an exemplary embodiment of the present invention.
Figure 7:
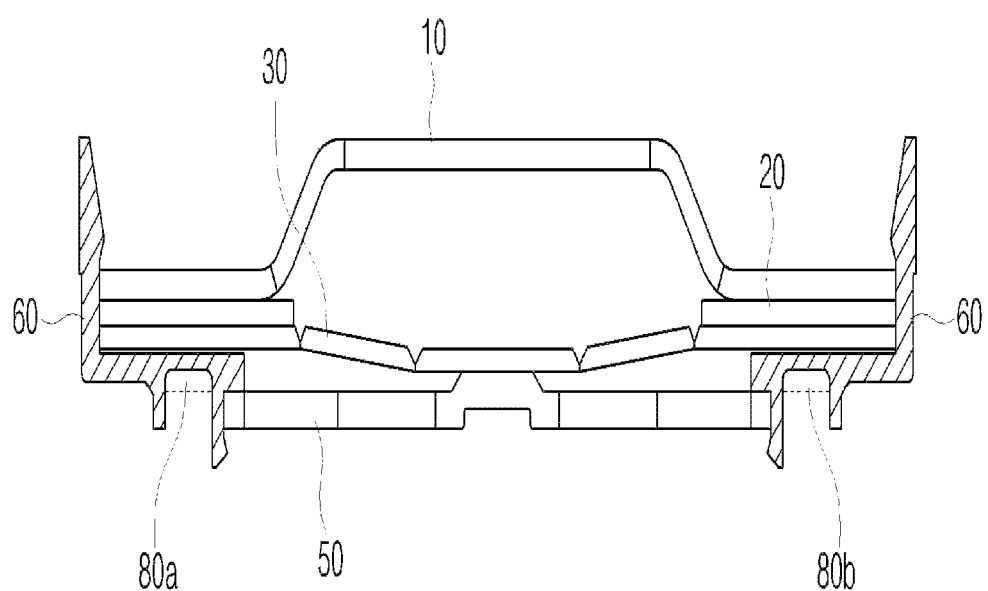

The integrated gasket according to the present exemplary embodiment can be variably altered. For example, reinforcing members 70a and 70b can be formed at lower end portions of the integrated gasket 60 as shown in FIG. 6.

The cap assembly according to the present exemplary embodiment has the structure in which the top cap 10 having one or more gas discharge holes and mounted on the open upper end portion of the cylindrical can accommodating the electrode assembly, the PTC element 20, the safety vent 30, and the CID 50 are stacked (or laminated), and the integrated gasket 60 is mounted on the outer circumferential surface of the stacked structure, which is then fixedly packed, and in this case, the integrated gasket fixed within the can may be deformed (i.e., the integrated gasket is bent in shape) during the packing process, leaving a possibility of a defective insulation.

Thus, in the present exemplary embodiment, the reinforcing members 70a and 70b are additionally provided to the lower end portions of the gasket 60 to remove the possibility of the electrical breakdown as a result of the gasket deformation. Also, because the reinforcing members 70a and 70b are positioned in the direction in which the CID is formed starting from the portion where the CID 50 and the gasket 60 are in contact with each other, the effect of supporting the CID is excellent.

The material of the reinforcing members 70a and 70b is not particularly limited and may be the same as that of the gasket. Also, the reinforcing members 70a and 70b may be formed to have the same thickness as that of the CID. As for the length of the reinforcing members 70a and 70b, the reinforcing members 70a and 70b are formed at partial regions of the lower end portions of the integrated gasket 60 as shown in FIG. 6, but without being limited thereto, the reinforcing members 70a and 70b may be formed on the entire regions of the lower end portions of the integrated gasket 60 or may be appropriately selected as necessary.

In addition, portions 80a and 80b of the lower end portions, which are in contact with the CID 50, of the integrated gasket 60 according to the present exemplary embodiment may be formed to be elastic. In general, the CID is inserted into the gasket so as to be used, and in this case, if the gasket is too thick, it would be difficult to insert the CID 50 in the gasket. Thus, in the present exemplary embodiment, the gasket 60 is designed such that its thickness of the lower end portions which are in contact with the CID 50 is smaller than that of the CID, namely, the corresponding gasket portions are made flexible, in order to facilitate the insertion of the CID 50. When the integrated gasket 60 is configured to have elasticity, the thickness of the lower end portions of the integrated gasket 60 in contact with the safety vent 30 and the CID 50 may be smaller than the thickness ranging from 30 percent to 40 percent of the original thickness, and in this case, if the thickness of the lower end portions of the integrated gasket 60 is out of the range, the effect of supporting the CID 50 could be possibly degraded, and thus, not desirous.

The safety vent 30 according to the present exemplary embodiment is a sort of safety element guaranteeing stability or safety of the battery by discharging a gas when the battery operates abnormally or when the internal pressure of the battery increases due to degradation of the components of the battery. For example, when a gas is generated within the battery so the internal pressure increases to beyond a threshold value, the safety vent is ruptured to allow the gas discharge through the ruptured portion to be exhausted out through one or more gas discharge holes formed on the top cap.

The safety vent is not particularly limited but it is made of an aluminum plate material having a thickness, preferably, ranging from 0.15 mm to 0.4 mm in order to have such rigidity as to be ruptured by the internal pressure which has been increased to beyond the threshold value.

In a preferred embodiment, the safety vent has such a shape that its center is downwardly embayed in order to interrupt current before a gas is discharged under an abnormal condition. Upper and lower vent portions forming the embayed region include first and second notches, respectively. The first notch forms a closed curved line and the second notch formed at a lower portion forms an open curved line with one side thereof open. The second notch may be formed to be deeper than the first notch.

Thus, because the second notch is formed to be deeper than the first notch, when a pressurization gas stronger than a second threshold pressure presses the safety vent 30, the second notch is cut out. Meanwhile, when the pressurization gas weaker than the second threshold pressure acts on the safety vent, the first notch acts together with the second notch to allow the embayed region to be lifted up.

Also, the CID 50 is a member to be ruptured when the internal pressure of the battery increases in order to interrupt current. The CID 50 is not particularly limited and any member can be employed so long as it can play such a role. Preferably, the CID 50 may be configured such that one or more penetration holes are provided to discharge a gas therethrough, a protrusion welded to a lower end of the embayed region of the safety vent 30 and upwardly protruded is formed at the center thereof, a positive electrode lead connected to a positive electrode of the jelly-roll is electrically connected through a lower end section of the region excluding the protrusion, and a bridge including three to five through holes on the concentric circles based on the protrusion and notches connecting the through holes is formed, but the CID 50 is not limited thereto.

Thus, when the internal pressure of the battery increases abnormally, the pressurized gas passes through the penetration holes and the through holes of the CID to upwardly press the safety vent 30, according to which the downwardly embayed region of the safety vent 30 is lifted up, allowing the protrusion welded to the embayed region to be easily separated from the CID 50 at more than a certain pressure (referred to as a 'first threshold pressure'), thus interrupting electrical connection of the CID 50 to the safety vent. Despite the current interruption, if the pressure is continuously increased to reach beyond a certain level (referred to as a 'second threshold pressure', hereinafter), the second notch of the safety vent 30 is cut out, allowing the internal pressurization gas to be exhausted out through the holes of the top cap.

Preferably, the notch is formed on the concentric circle based on the protrusion of the CID 50, so that the protrusion welded to the embayed region can be easily separated from a main body of the CID 50 at more than the first threshold pressure. That is, when the pressurization gas is applied to the safety vent due to the increased internal pressure of the battery, the embayed region is lifted up and the protrusion welded to the embayed region can be easily separated from the main body of the CID 50 as the notch is cut out.

According to circumstances, the PTC element for interrupting current according to a battery resistance increased greatly when internal temperature of the battery increases may be interposed in a tightly attached state between the top cap 10 and the safety vent 30.

A welding method for coupling the CID 50 and the safety vent 30 is not particularly limited. For example, the CID 50 and the safety vent 30 may be coupled through ultrasonic welding or laser welding such as by irradiating $CO_2$ laser beams, or the like. When the CID 50 and the safety vent 30 is coupled through ultrasonic welding, it may be necessary to press the vicinity of the plate by a welding jig in order to perform precise welding. Meanwhile, when laser welding is performed by irradiating $CO_2$ laser beams or the like, a welding width can be easily adjusted without having to use a device and an energy capacity is large, and in addition, because the laser beams are absorbed as thermal energy from the surface of a metal foil, a welding speed can be set to be fast, improving the productivity.

The present invention provides the cylindrical rechargeable battery including the cap assembly as described above.

The cylindrical rechargeable battery is fabricated as follows: In a state that the jelly-roll type electrode assembly is mounted in the cylindrical metal can, the cap assembly as described above is coupled to the open end of the meal can, the negative electrode of the electrode assembly is welded to the lower end of the can, and the positive electrode of the electrode assembly is welded to the protrusion terminal of the top cap coupled to the upper end thereof in order to hermetically seal the battery with the electrode assembly and electrolyte insertedly installed therein.

The battery according to the present exemplary embodiment may be a lithium rechargeable battery having a high energy density, discharge voltage and output stability. Other constituents of the lithium rechargeable battery according to an exemplary embodiment of the present invention will now be described in detail.

In general, the lithium rechargeable battery includes a positive electrode, a negative electrode, a separation film, a lithium salt-contained non-aqueous electrolyte, and the like.

The positive electrode is fabricated by coating a mixture of a positive electrode active material, a conductive agent, and a binder on a positive electrode collector, and drying the same, and a filler may be added as necessary.

The negative electrode is fabricated by coating a negative electrode material on a negative electrode collector and drying the same, and the components as described above may be additionally included.

The separation film is interposed between the negative and positive electrodes. An insulating thin film having a high ion permeability and mechanical strength may be used as the separation film.

The lithium salt-contained non-aqueous electrolyte may include non-aqueous electrolyte and lithium salt, and in this case, liquid phase non-aqueous electrolyte, solid electrolyte, inorganic solid electrolyte, and the like, may be used as the non-aqueous electrolyte.

The collector, the electrode active material, the conductive agent, the binder, the filler, the separation film, the electrolyte, the lithium salt, and the like are known in the art, so a detailed description thereof will be omitted.

The lithium rechargeable battery according to the present exemplary embodiment can be fabricated through a general method known in the art. Namely, a porous separation film is inserted between the positive electrode and the negative electrode, to which electrolyte is injected to fabricate the lithium rechargeable battery.

The positive electrode may be fabricated by coating slurry containing, for example, a lithium transition metal oxide active material, the conductive agent, and the binder, on the collector and drying the same. Likewise, the negative electrode may be fabricated by coating slurry containing, for example, a carbon active material, the conductive agent, and the binder, on the thin collector and drying the same.

The process of fabricating the cylindrical rechargeable battery according to an exemplary embodiment of the present invention will now be described.

The battery according to the present exemplary embodiment is fabricated by inserting the electrode assembly into the interior of the can, injecting electrolyte thereto, and mounting the cap assembly on the open upper end of the can. The cap assembly has such a structure in which the top cap and the safety vent for dropping an internal pressure are tightly attached within the air-tight gasket mounted at an upper beading portion of the can. The central portion of the top cap is upwardly protruded to serve as a positive electrode terminal as it is connected with an external circuit, and a plurality of penetration holes are formed in the vicinity of the protrusion to allow the compressed gas within the can to be discharged therethrough.

The PTC element for interrupting current according to the battery resistance greatly increased when the temperature within the battery is greatly increased is provided between the top cap and the safety vent.

The safety vent is a thin film structure charged with current. The central portion of the safety vent is depressed to be formed as the embayed type central portion, and two notches each having a different depth are formed at upper and lower bent portions of the central portion. When the internal pressure of the can goes up to above the threshold pressure, the notches formed at the safety vent cannot tolerate to be ruptured to allow the pressurization gas within the can to be leaked out through the holes of the top cap. During this process, the CID installed at the lower side of the safety vent interrupts current as well as discharges gas out of the battery.

The CID includes a plurality of penetration holes formed at the side surface thereof to allow the gas to be discharged therethrough and the protrusion formed at the central portion thereof such that it is upwardly protruded. The upper surface of the protrusion and the lower surface of the embayed type central portion of the safety vent are coupled through welding or the like.

The cap assembly in which the top cap, the PTC element, the safety vent, and the CID are sequentially stacked is packed and fixed by using the integrated gasket and then received in the cylindrical can.

In the present exemplary embodiment, the integrated gasket is designed by integrating the first gasket for fixing the top cap, the PTC element, and the safety vent and the second gasket for fixing the CID, to thereby increase the contact area between the safety vent and the gasket to obtain good sealing characteristics to thus solve the problem of an electrical breakdown. Also, because the support area of the CID and the gasket is increased, a short-circuit reactivity of the CID can be improved. In addition, because the reinforcing members are added to the lower end portions of the integrated gasket or the portion, which is in contact with the CID, of the integrated gasket is designed to be elastic, a leakage of electrolyte and a CID short-circuit delay can be fundamentally prevented and the stability and safety of the battery can be greatly improved. Moreover, because the gasket structure is integrated, the components can be simplified and the production unit cost can be reduced.

The foregoing description of the preferred embodiments of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto and their equivalents.

What is claimed is:

1. A cap assembly of a cylindrical rechargeable battery comprising:
    a top cap, a positive temperature coefficient (PTC) element, a safety vent, and a current interruptive device (CID) in order; and
    a gasket covering the top cap, the PTC element, the safety vent, and the CID,
    wherein the safety vent has a downwardly indented center,
    wherein the CID has one upper end portion contacting the safety vent and one lower end portion connected to a positive electrode of an electrode assembly,
    wherein the gasket integrates a first gasket and a second gasket, the first gasket covering the top cap, the PTC element, and the safety vent and the second gasket covering the CID and insulating an edge surface of the CID from the safety vent,
    wherein the gasket is between the safety vent and the CID,
    wherein a depression is formed at a bottom surface of the integrated gasket,
    wherein the bottom surface of the integrated gasket contacts a top surface of the CID, to facilitate an insertion of the CID,
    wherein the depression is formed by a first flange depending from the bottom surface of the integrated gasket and a second flange depending from the bottom surface of the integrated gasket, the second flange spaced radially outwardly from the first flange, and
    wherein the CID contacts a radially inner surface of the first flange.

2. The cap assembly of claim 1, wherein the CID has a diameter ranging from 10 mm to 15 mm.

3. A cylindrical rechargeable battery comprising the cap assembly of claim 2.

4. The cap assembly of claim 1, wherein a notch is formed on a concentric circle based on a protrusion of the CID.

5. A cylindrical rechargeable battery comprising the cap assembly of claim 4.

6. A cylindrical rechargeable battery comprising the cap assembly of claim 1.

7. The rechargeable battery of claim 6, wherein the rechargeable battery is a lithium rechargeable battery.

8. The cap assembly of claim 1, wherein upper and lower vent portions forming the indented region of the safety vent include a first notch and a second notch, respectively, and the second notch is formed to be deeper than the first notch.

9. The cap assembly of claim 8, wherein a reinforcing member is formed at a lower end portion of the gasket.

10. A cylindrical rechargeable battery comprising the cap assembly of claim 9.

* * * * *